(12) United States Patent
Rive et al.

(10) Patent No.: US 7,627,667 B1
(45) Date of Patent: Dec. 1, 2009

(54) METHOD AND SYSTEM FOR RESPONDING TO AN EVENT OCCURRING ON A MANAGED COMPUTER SYSTEM

(75) Inventors: Russell S. Rive, San Francisco, CA (US); Peter Joshua Rive, San Francisco, CA (US)

(73) Assignee: Dell Marketing USA, L.P., Round Rock, TX (US)

( * ) Notice: Subject to any disclaimer, the term of this patent is extended or adjusted under 35 U.S.C. 154(b) by 1418 days.

(21) Appl. No.: 10/306,049

(22) Filed: Nov. 26, 2002

(51) Int. Cl.
G06F 15/173 (2006.01)
(52) U.S. Cl. ...................................................... 709/224
(58) Field of Classification Search ................. 709/202, 709/223, 224; 719/317, 318; 700/49; 702/176; 706/46, 47; 713/340
See application file for complete search history.

(56) References Cited

U.S. PATENT DOCUMENTS

| | | | | |
|---|---|---|---|---|
| 5,566,339 A | * | 10/1996 | Perholtz et al. | 713/340 |
| 5,790,798 A | * | 8/1998 | Beckett et al. | 709/224 |
| 6,049,828 A | * | 4/2000 | Dev et al. | 709/224 |
| 6,092,102 A | * | 7/2000 | Wagner | 340/7.29 |
| 6,477,667 B1 | * | 11/2002 | Levi et al. | 714/57 |
| 7,194,623 B1 | * | 3/2007 | Proudler et al. | 713/164 |

* cited by examiner

Primary Examiner—Nathan J Flynn
Assistant Examiner—Mark O Afolabi
(74) Attorney, Agent, or Firm—Schwegman, Lundberg & Woessner, P.A.

(57) ABSTRACT

A method of responding to an event occurring on at least one managed computer system is provided. The method includes receiving event data from a monitoring agent on the managed computer system at a client installation, and processing the event data at a management system to determine if a verbal response is required. A voice call to the client installation is initiated when a verbal response is required. The method includes retrieving associated response data in a reference database wherein the associated response data is associated with the event and the managed system. In certain embodiments, the method includes identifying if the event meets a customer defined severity level, and initiating the voice call when the event meets the customer defined severity level.

25 Claims, 9 Drawing Sheets

View Asset Details

170

| System Information | | | | |
|---|---|---|---|---|
| Asset Number | 12968 | Installed Software | | |
| Contact Name | Suman Katla | 1 | Adobe Acrobat 4.0 | |
| Office | Everdream Corp. | 2 | F-Secure SSH Tunnel & Terminal | |
| Address | 6591 Dumbarton Circle Fremont, CA 94555 | 3 | LiveReg (Symantec Corporation) | |
| | | 4 | LiveUpdate 1.5 (Symantec Corporation) | |
| System User Name | Administrator | 5 | Microsoft Internet Explorer 5.5 | |
| Email | N/A | 6 | Microsoft Office 2000 SR-1 Disc 2 | |
| Last connected (GMT) | Tue, 27 Nov 2001 19:56:05 GMT | 7 | Microsoft Office 2000 SR-1 Professional | |
| Operating System | Windows2000 5.00.2195 Service Pack 1 | 8 | Microsoft SQL Server 2000 | |
| Processor Speed | 800 MHz | 9 | MSN Messenger Service 3.6 | |
| Network Card | Unknown | 10 | Norton AntiVirus 2001 | |
| Hard Disk | 19 GB free    24 GB max | 11 | Online Backup | |
| Installed RAM | 256 MB | 12 | Oracle Jinitiator 1.1.5.21.1 | |
| Service Type | Complete | 13 | PowerArchiver | |

| Notes |
|---|

*FIG. 8*

CONTROL CENTER                                             Home | Help | Resources | Sign Out Assets  |  Service  |  Reports  |  Administration

Service > Manage Service Requests                                     256

Use the search form below to retrieve service request information.

| Search Criteria | | | |
|---|---|---|---|
| Service Request Number | | Select Company | |
| Status | All | | |
| Queue | All | Contact Name | |
| External Priority | All | City | |
| External Owner | | State | All |
| Subject | | | |
| Problem Statement (contains phrase) | | | |
| Date Opened (GMT) ☐ | Do Not Display Welcome Calls ☐ | Display Only Escalated Service Requests ☐ | |

| Options |
|---|

*FIG. 9*

METHOD AND SYSTEM FOR RESPONDING TO AN EVENT OCCURRING ON A MANAGED COMPUTER SYSTEM

FIELD OF THE INVENTION

The present invention relates generally to the field of managing services utilizing a computer-based system and, more specifically, to a method and system for responding to an event on a managed computer system.

BACKGROUND OF THE INVENTION

The deployment of computer systems in the workplace has become increasingly widespread, and computer systems have become indispensable tools for workers in most industries. The challenge of providing adequate management and support for such computer systems has paralleled this deployment. Organizations with more than a few computers may employ an Information Technology (IT) professional (e.g., an IT administrator) to manage computer systems and networks of the organization. An IT administrator is typically burdened with a large number of tasks and responsibilities relating to such computer systems and networks. For example, the IT administrator, and supporting staff, are typically responsible for the installation and set up of computer systems and networks within an organization, the upgrading and maintenance of installed computer systems, and responding to service requests from users within the organization.

Although technology has in recent years driven the cost of computer systems down, service and support costs continue to escalate.

The challenges facing IT professionals within organizations have been compounded by the emergence of an increasingly mobile and distributed workforce. For example, an increasing number of employees are opting to telecommute. Further, as workers become increasingly mobile, there is an increasing demand for applications to be deployed on mobile devices (e.g., notebook computers, Personal Digital Assistants (PDAs), etc.). The responsibility for installing, maintaining and upgrading the software on such mobile devices falls within the increasing number of challenges facing IT professionals. Further, the point at which technical assistance is required for a particular computer system may vary dependent upon the level of expertise of the user or users of the computer system.

SUMMARY OF THE INVENTION

According to one aspect of the present invention, there is provided method of responding to an event occurring on at least one managed computer system, the method including:

receiving event data from a monitoring agent on a managed computer system at a client installation, the event data being associated with the event;

processing the event data at a management system to determine if a verbal response is required; and initiating a voice call to the client installation when a verbal response is required.

According to a further aspect of the invention, there is provided a system to facilitate provision of services to a managed computer system, the system including:

a receiver to receive event data from a monitoring agent on the managed computer system at a client installation; and a processor to process the event data at a management system to determine if a verbal response is required and initiating a voice call to the client installation when a verbal response is required.

The invention extends to a machine-readable medium embodying instructions to execute the method.

Other features of the present invention will be apparent from the accompanying drawings and from the detailed description, which follows.

BRIEF DESCRIPTION OF THE DRAWINGS

The present invention is illustrated, by way of example, and not limitation in the figures of the accompanying drawings, in which like references indicate similar elements.

In the drawings,

FIG. 8 illustrates an exemplary asset details interface that may be generated at a technical support console of a control center in response to the occurrence of an event on the client device;

FIG. 9 illustrates an exemplary service request interface that may be generated at a technical support console of the control center in response to the occurrence of an event on the client device.

DETAILED DESCRIPTION

A method and system for responding to an event on a managed computer system are described. In the following description, for purposes of explanation, numerous specific details are set forth in order to provide a thorough understanding of the present invention. It will be evident, however, to one skilled in the art that the present invention may be practiced without these specific details.

Figure 1:
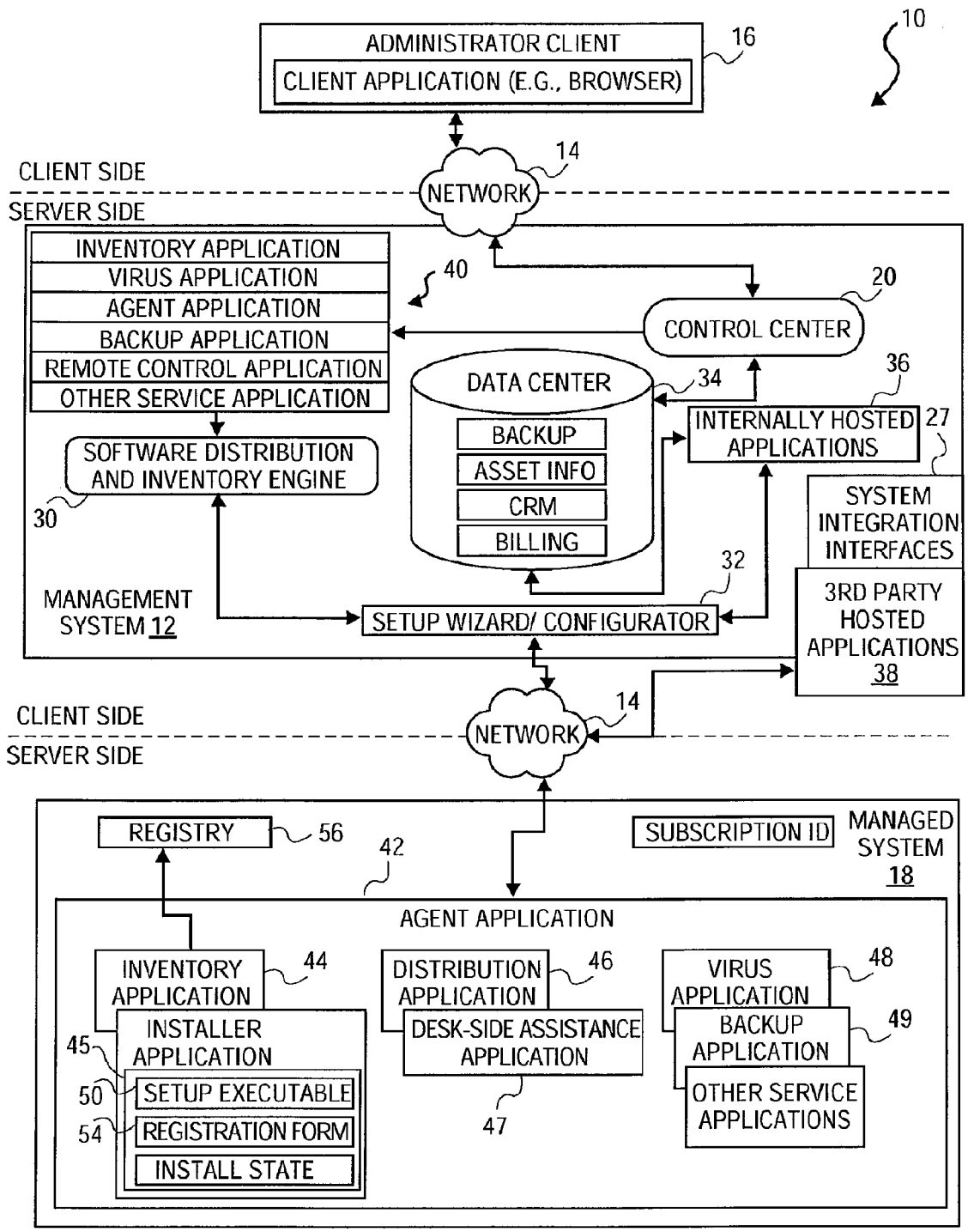
FIG. 1 is a block diagram illustrating a system, according to an exemplary embodiment of the present invention, to manage services for multiple managed computer systems.

FIG. 1 is a block diagram illustrating a system 10, according to an exemplary embodiment of the present invention, for responding to events on multiple managed computer systems. Included within the exemplary system 10 is a management system 12, which is coupled by a network 14 (e.g., the Internet) to an administrator client 16 and one or more managed systems 18. The managed systems 18 may be located remotely from the management system 12, or at the same location. The managed systems 18 may each be any one of a number of types of devices or systems including, but not limited to, a personal computer (PC), workstation, Personal Digital Assistant (PDA), set-top box (STB), cellular telephone, network device (e.g., switch, router, or bridge) or any other device capable of executing software.

Turning first to the management system 12, a number of applications and engines are integrated into a single framework that utilizes an open architecture and industry standards to provide an Information Technology (IT) management platform. Service applications may be hosted at an operator of the management system 12 (e.g., a Managed Service Provider (MSP)), or may be hosted by a third-party vendor. The management system 12, in one embodiment, utilizes web services (e.g., the Simple Object Application Protocol (SOAP)), to facilitate systems integration.

Figure 2:
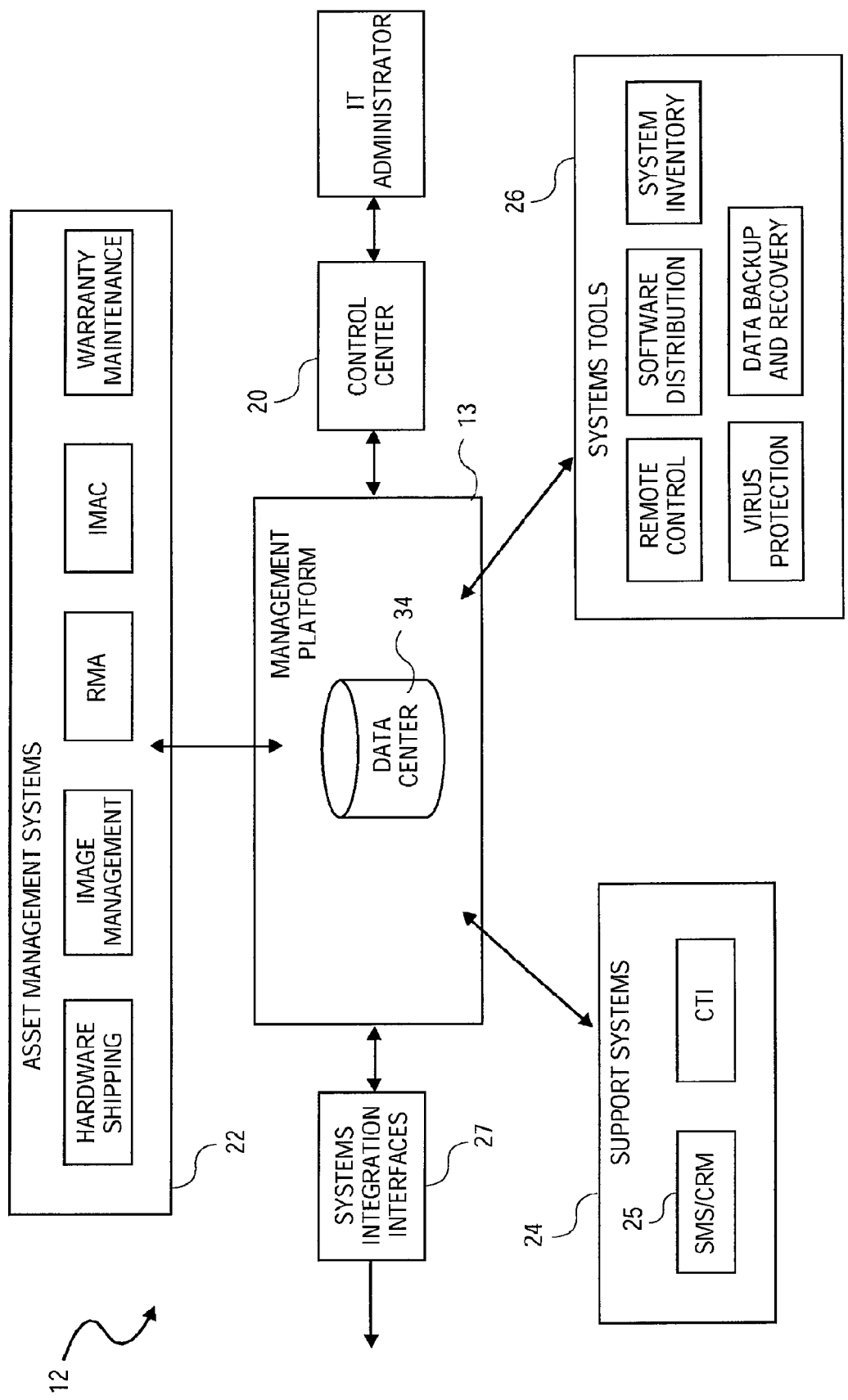
FIG. 2 is a block diagram illustrating a conceptual representation of the management system, according to an exemplary embodiment of the present invention.

FIG. 2 is a block diagram illustrating a conceptual representation of the management system 12, according to an exemplary embodiment of the present invention. The system 12 may conceptually be viewed, in one exemplary embodiment, as providing asset management systems 22 that provide access to a range of asset management functions, and support systems 24 to assist IT professionals in providing and managing services to the managed systems 18. The asset management functions provided by the asset management systems 22 may include physical asset (e.g., hardware and software) information (e.g., location, asset inventory, etc.), financial information (e.g., procurement, ownership) and warranty/service information (e.g., entitlements, service history, etc.). Physical asset information may include asset location and asset inventory information. Asset location information is tracked from inventory to installation to disposal via a manufacturing system (not shown). In one embodiment, physical asset information may be imported into the management system 12 from a third-party system utilizing an appropriate system integration interface 27.

Physical asset information may be obtained on a regular basis by the management system 12 utilizing WMI, DMI, registry and file queries that track hardware configurations and installed software on the managed systems 18.

Turning now specifically to the support systems 24, in one exemplary embodiment, the support systems 24 assist a technical support person such as an IT professional (e.g., a solutions analysis) in providing service in two areas, namely service request management and telephony systems. The support systems 24 are shown in FIG. 2 to include a service management system 25, or a Customer Relationship Management (CRM) system, to manage service requests and service workload. The CRM system may operate as a subscription component and be updated to reflect an entitlement (e.g., as a result of a subscription agreement) of a particular managed system 18 to a number of service applications 40 (see FIG. 1), responsive to a distribution request.

The service management system 25 may be utilized to service requests for compliance with a service level agreement and also to provide managers with relevant statistics (e.g., problem resolution times, open service requests, etc.). In addition, custom workflow rules may be defined within a graphical environment to create appropriate responses for a range of situations. In particular and as described in more detail below, in one embodiment the management system 12 responds, automatically without human interaction, to an event on the managed system 18 by initiating a voice call to the managed system 18. In one embodiment, the service management system 25 (see FIG. 2) may be Siebel Service™ service management system.

The support systems 24, in one embodiment, also enable support to be provided across multiple support organizations. To this end, the support system 24 may enable "virtual support communities" where service requests require collaboration. Specifically, an external support vendor is provided with the ability to access and modify service requests through the control center 20. However, if a particular support vendor already has existing systems in place for service request management, systems integration interfaces 27 (e.g., using XML/SOAP) may be utilized for systems integration.

The telephony infrastructure of the management platform 13 (e.g., Computer Telephony Integration (CTI) infrastructure 29) may facilitate any number of features, such as real-time fail-over across distributed call centers, detailed call metrics at granular levels, Computer Telephony Integration (CTI) for call center efficiency, centralized call routing rules, and custom Interactive Voice Recognition (IVR) on a per number basis.

System tools 26, in one embodiment, reside on the managed system 18 and are responsible for a number of services to the managed systems 18 (e.g., self-maintenance, system protection and disaster recovery). The system tools 26 may be utilized by an end user of the managed system 18 or by support staff of a managed service provider to assist in problem resolution. Two exemplary system tools 26 that may be provided are data back-up and recovery, and virus protection.

Returning now to the high-level architectural representation of the system 10 provided in FIG. 1, a more detailed description of the architecture will now be provided. The management system 12, in one exemplary embodiment, is shown to include the control center 20, a software distribution and inventory engine 30, a configurator 32, a data center 34, a collection of internally-hosted applications 36, and the system integration interfaces 27 that enable access to one or more third-party hosted applications 38.

Considering first the control center 20, in one exemplary embodiment the control center 20 includes a secure web application that allows an IT professional (e.g., an administrator) to specify, configure, and view services that are being delivered to multiple managed systems 18. For example, the control center 20 may allow an IT professional to access desktop and service data operations. Analytical services and reports are driven off data stored in the data center 34, which collects data from multiple applications within the management system 12 and stores the collected data in a database scheme suited for standard and custom reports. Application servers and databases that constitute the control center 20 reside behind a firewall and are secured by data segregation, user authentication, and secure data transport (e.g., HTTPS).

The control center 20 may enable an IT professional to manage assets and services by issuing queries across system inventory (e.g., hardware, software and services (e.g., network access)), users, physical location and cost centers, manage software licenses, and access new system rollout information. An IT professional may also query service request information (e.g., response times), and update and create service requests. In addition, the control center 20 allows an IT professional to manage deployment of an agent application 42 to multiple managed systems 18 and to create new deployment configurations. The control center 20 also provides reporting and administrative capabilities to an IT professional. For example, the control center 20 is able to generate graphical reports, and also to deliver exportable data for additional analysis.

In summary, an IT professional can log into the control center 20, and view the status of multiple managed services, and remove and modify selected services from selected managed systems 18.

FIG. 1 shows the control center 20 as communicating service input, received from an IT professional, that identifies a number of services (each of which may be enabled by a respective application (or package) 40) to the software distribution and inventory engine 30.

The software distribution and inventory engine 30, which is responsive to group and services inputs, identifies and communicates to the configurator 32 a collection of service applications, which enable the provision and management of services, to be installed on one or more managed systems 18 as "components" of the agent application 42. The configurator 32, in one embodiment, operates to manage the configuration of the services subscribed by and delivered to a managed system 18. To this end, an agent application 42, installed on each managed system 18, operates in conjunction with the configurator 32. Specifically, at an initial registration of a new managed system 18, the configurator 32 runs a "setup wizard" or setup executable 50 to gather information regarding the managed system 18 (e.g., user information), and creates an account with which the managed system 18 is associated. Multiple managed systems 18 may be associated with the single account of an IT professional (e.g., an administrator). The configurator 32, following initial registration, also downloads the setup executable 50 to the managed system 18, whereafter communications can be established between the configurator 32 and the setup executable 50 for the purposes of configuring and installing further services. As is described, the configurator 32 receives a list of services that are to be managed from the control center 20.

Following completion of an initial installation, should an IT professional (e.g., an administrator) request additional services to be installed on the managed system 18, the configurator 32 operates to install and register the appropriate services. The configurator 32 receives an instruction that consists of a system identifier and services that need to be installed on the managed system 18 from the control center 20, as inputted by IT professional.

The configurator 32 allows for service configuration applications, (or service applications) shown in FIG. 1 to form part of the agent application 42, to be incorporated within the agent application 42. Such service applications may include, for example, back-up, virus protection, email, Internet connectivity and desk-side assistance/customer service applications. Each application, in one embodiment, includes the ability to create a new account on a service server that may host an application (e.g., the internally-hosted application 36 or a third-party hosted application 38). In the situation that a third-party service provider hosts an application, then a copy of all account creation and configuration information may be stored within the data center 34 in order to enable the control center 20 to query service account information without having to provide the ability to query databases of a third-party directly.

Once an account is created on a service server, the appropriate service is installed and configured on the managed system 18. To this end, an appropriate service application 40 is sent to the managed system 18 (e.g., by sending a command line from the control center 20 to the software distribution and inventory engine 30 to send the appropriate application or package to the managed system 18 via the configurator 32).

Once the appropriate service application 40 is downloaded, the configurator 32 configures the service application 40 to conform to the account that it previously created on the service server. When the control center 20 queries the databases of the service server that includes the account information, the control center 20 automatically detects that a new service has been stored on a managed system 18, and indicates this installation. The control center 20 is also responsible for advising a financial system (not shown) that a new service has been added to a managed system 18, and the appropriate account (e.g., an account associated with a particular administrator) will be recognized as the billing account for the newly installed service. While the provision and management of a service is described above as being facilitated by the installation and/or execution of an appropriately configured service application 40 on the managed system 18, it will be appreciated that certain services may not require such an installation and/or execution, and could be provided from a remote location and/or without a service application.

FIG. 1 also illustrates the data center 34 as maintaining information to support the asset management systems 22, the support systems 24, and the system tools 26, described above with reference to FIG. 2.

Figure 3:
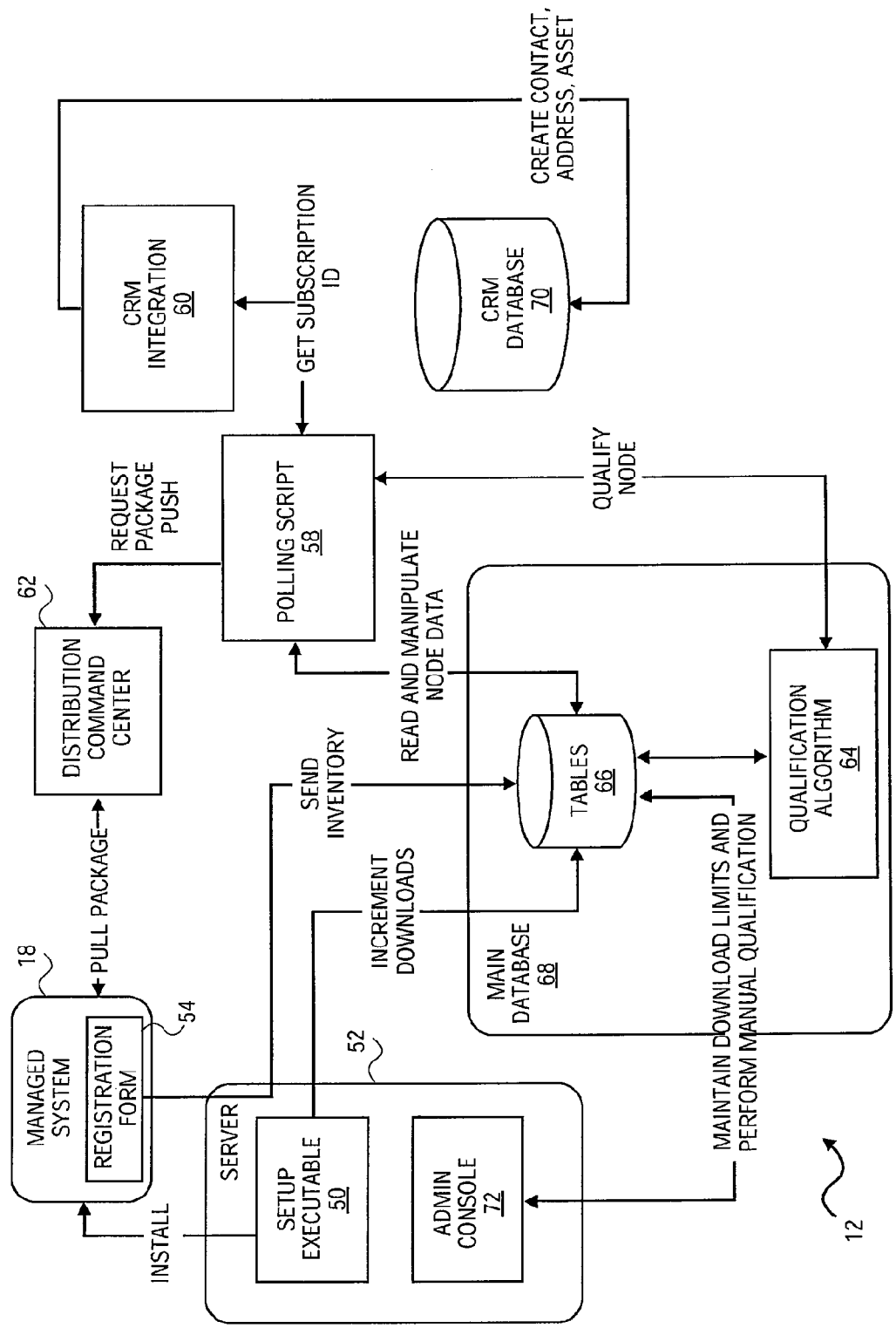
FIG. 3 is a block diagram illustrating further details of the software architecture (as opposed to the service architecture) of the management system, according to an exemplary embodiment of the present invention.

FIG. 3 is a block diagram illustrating further details of the software architecture (as opposed to the service architecture) of the management system 12, according to an exemplary embodiment of the present invention. The management system 12, illustrated in FIG. 3, operates to deploy and integrate a number of services to a managed system 18. Such services may be, in one exemplary embodiment, provided partially by an operator of the management system 12 and provided partially by third-party vendors.

The management system 12 may include a number of different components executing on different systems. It should be noted that the components illustrated in FIG. 3 are not necessarily physical components (e.g., which have interfaces accessible through an API), but may be components described for the purposes of facilitating understanding of an exemplary software architecture. However, each of the components illustrated in FIG. 3 may ultimately be implemented in code within the management system 12.

The technology architecture of the management system 12, as illustrated in FIG. 3 and according to an exemplary embodiment, is a combination of third-party applications, C++ service applications, scripts, stored procedures and active server pages. Each of the components illustrated in FIG. 3 will now be discussed in further detail.

A setup executable 50 is stored on a server 52, and is downloaded to and executes on a managed system 18 to install one or more service applications 40 (e.g., a distribution application 46, a desk-side assistance application 47, and an inventory application 44 as shown in FIG. 1) on the managed system 18. For example, the distribution application 46 may be a software component developed by Mobile Automation (e.g., the Mobile Automation 2000 Enterprise Edition). The desk-side assistance application 47 may be supplied by Control-F1, or Microsoft Corp. (e.g., NetMeeting) and may include system diagnostic capabilities. In addition the setup executable 50 may operate to install a "help" window, and insert appropriate short cuts for assistance and information into a "Start Menu" on the managed system 18.

In one embodiment, the setup executable 50 is account-specific, in that every account has a different binary and account number. Each account furthermore may have a finite number of downloads, which number is maintained in the data center 34. The setup executable 50, also displays a user registration form 54 to a user of the managed system 18 during installation, which takes control of and directs the setup procedure performed by the setup executable 50.

A polling script 58 monitors all new registrations of managed systems 18, obtains a subscription identifier from a CRM integration application 60, pushes packages (or applications) to support additional services to the managed system 18 via a distribution command center 62, and provides emails to a user of the managed system 18, or an appropriate administrator, regarding updates to the managed system 18. The obtaining of a subscription identifier by the polling script 58 is contingent on the managed system 18 qualifying to receive delivery of one or more services. To this end, the polling script 58 interacts with a qualification algorithm 64 to qualify a managed system 18. In one embodiment, the polling script 58 makes calls to the qualification algorithm 64 (e.g., a stored procedure). If the qualification succeeds, the subscription identifier is created and a services application 40 (or packages) is pushed to the managed system 18. The user of the managed system 18 is then sent an email including the subscription identifier associated with the managed system 18 and/or the user.

The qualification algorithm 64, in one exemplary embodiment, is a stored procedure that uses inventory information retrieved from a managed system 18 (e.g., inventory files and machine tables) in order to assess whether a managed system 18 qualifies for the provision and management of one or more services by the management system 12. For example, the inventory information may be matched against one or more qualification rules to determine whether the managed system 18 can be supported by the management system 12, and also whether one or more specific services can be provided and managed by the management system 12. To this end, different qualification rules may be associated with different services, depending upon the requirements to provide the respective services.

In one embodiment, the inventory information utilized by the qualification algorithm 64 to qualify a managed system may be stored in an appropriate table 66 within a main database 68 of the data center 34 (see FIG. 1). As discussed above, an inventory application 44 installed on the managed system 18 may, as part of the operations performed under the setup executable 50, harvest software, hardware and services (e.g., regarding existing services to which the managed system 18 has access) inventory information pertaining to the managed system 18. This information is then communicated to the management system 12 for storage within the table 66. Accordingly, the qualification algorithm 64 accesses this table 66 in order to obtain the inventory information to qualify the managed system 18. In an alternative embodiment, the qualification algorithm 64, in response to a request for qualification from the polling script 58, retrieves the inventory information directly from the managed system 18. In this case the inventory information is not necessarily stored within the main database 68. In the embodiment in which the inventory information is stored within the table 66, the main database 68 may be regarded as including a central inventory database that is accessed by the qualification algorithm 64.

FIG. 3 also illustrates the management system 12 as including the CRM integration application 60 that is responsible for generation of a subscription identifier responsive to a request from the polling script 58.

In one embodiment, the polling script 58 posts all fields for which information was received via the registration form 54 to an ASP page. The ASP page makes a call to a Java-built object, which inserts the information into a CRM database 70 associated with the CRM integration application 60.

The CRM integration application 60 is responsible for a generation of a subscription identifier, and also for the creation and maintenance of contact and account records for a customer of the management system 12. For example, a single customer (e.g., corporation) may have specific contact information, as well as a single account with which a number of managed systems 18 are associated.

It should also be noted that the installation of the agent application 40 is tightly integrated with the CRM database 70 by the CRM integration application 60. Specifically, the CRM integration application 60 automatically generates "trouble tickets" at the management system 12 if any part of the installation and/or configuration process fails or experiences difficulties.

In an exemplary embodiment, following the call from the ASP page, the ASP page returns a single string including the subscription identifier to a HTTP response buffer.

FIG. 3 also illustrates the server 52 as supporting an administrative console 72 that, according to an exemplary embodiment, includes a set of users interfaces that enable an administrator of the management system 12 to a manage accounts and downloads, and manually to force qualification, for example. Specifically, in one embodiment, Active Server Pages (ASP's) constitute this component and allow an administrator within the management system 12 to maintain account downloads (e.g., set a maximum number of downloads, view a download log, etc.) and manually to force qualification for one or more managed systems 18 if such managed systems 18 were failed by the qualification algorithm 64. When a manual qualification is forced, the appropriate ASP updates appropriate tables 66 within the main database 68 to indicate the qualification. The polling script 58 then recognizes the manually forced qualification, and sends the appropriate services application 40 to the appropriate managed system 18.

Regarding the various services that may be delivered to, and managed for, a managed system 18, the provision and management of each service may be facilitated by the installation of an appropriate service application 40 on the managed system 18. Each of the service applications 40 may include a dedicated installer, and be distributed either as part of an initial setup, or may be pushed to the managed system 18 subsequent to qualification of the managed system 18. The subsequent pushing of a service application 40 to the managed system 18 may be part of an initial configuration operation performed by the management system 12, or as part of a subsequent request from a customer for installation and/or provision of the relevant service. It should also be noted that, in one embodiment, the installation of service applications 40 might require administrative privileges under an operating system of the managed system 18. Specifically, the administrative privileges that may be required are privileges to write to a disk drive of the managed system 18, to install an application, to update a registry file, and to create services on the managed system 18.

Figure 4:
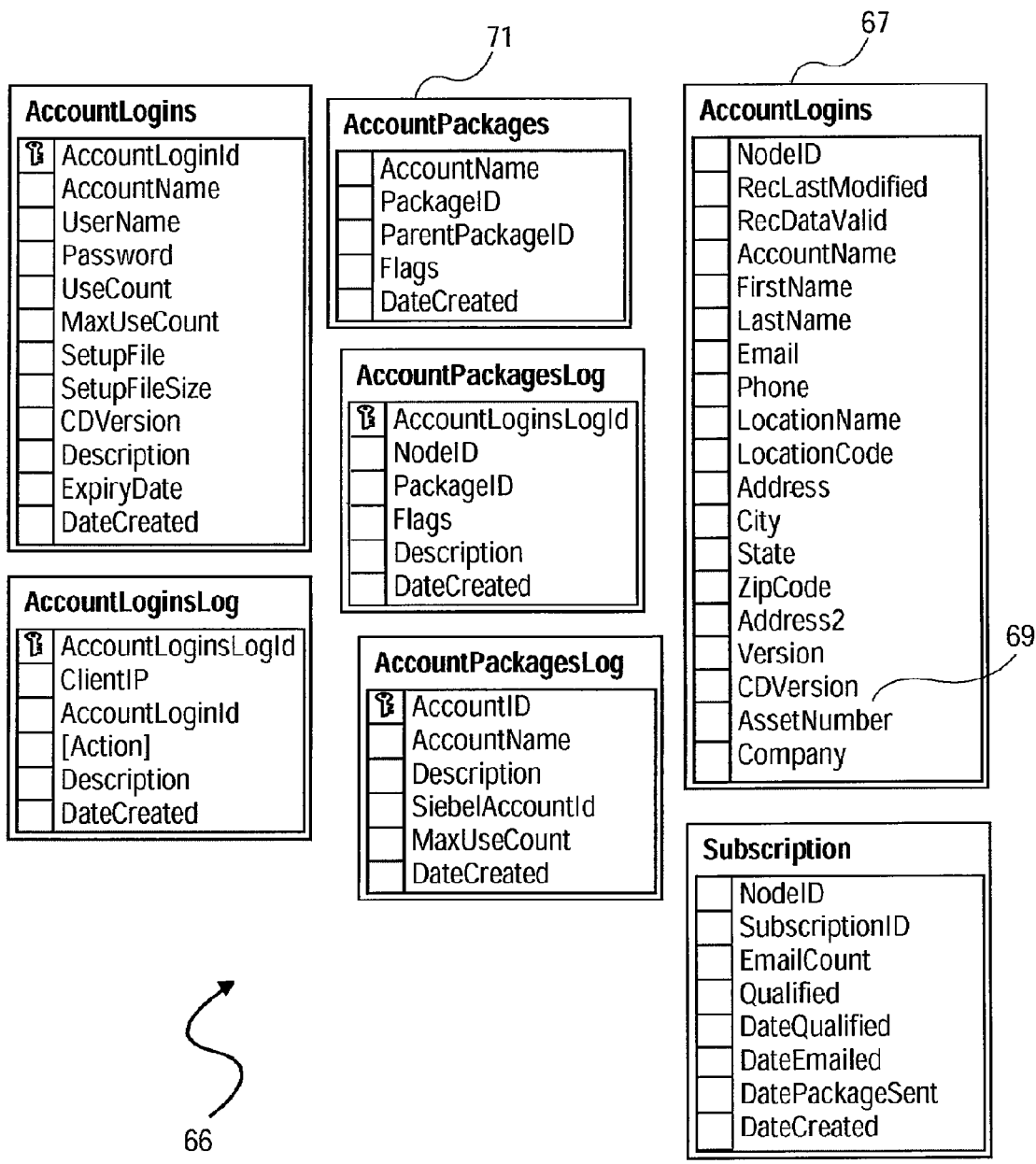
FIG. 4 is a database schema diagram illustrating exemplary tables that may be maintained within a main database so as to enable the management system to manage multiple managed systems and the provision of services to the managed systems for disparate service providers.

FIG. 4 is a database schema diagram illustrating exemplary tables 66 that may be maintained within the main database 68 so as to enable the management system 12 to manage multiple managed systems 18 and the provision of services to the managed systems 18 for disparate service providers.

The inventory application 44 may populate a registry asset information table 67 included within the table 66 to associate asset numbers 69 with each managed system 18, each asset number 69 identifying a particular software or hardware asset. An account packages table 71 maintains a record of service applications 40 that have been distributed to, and installed on, one or more managed systems 18 associated with a particular account.

As mentioned above, a technical support person such as an IT professional may remotely install various applications on the managed system 18 as well as monitor faults or operating errors on the managed system 18. For example, as described in more detail below, the managed system 18 may include a monitoring agent to monitor events occurring on the managed system 18 which, for example, may be a personal computer or a network of computers, an application server, database server or the like.

Figure 5:
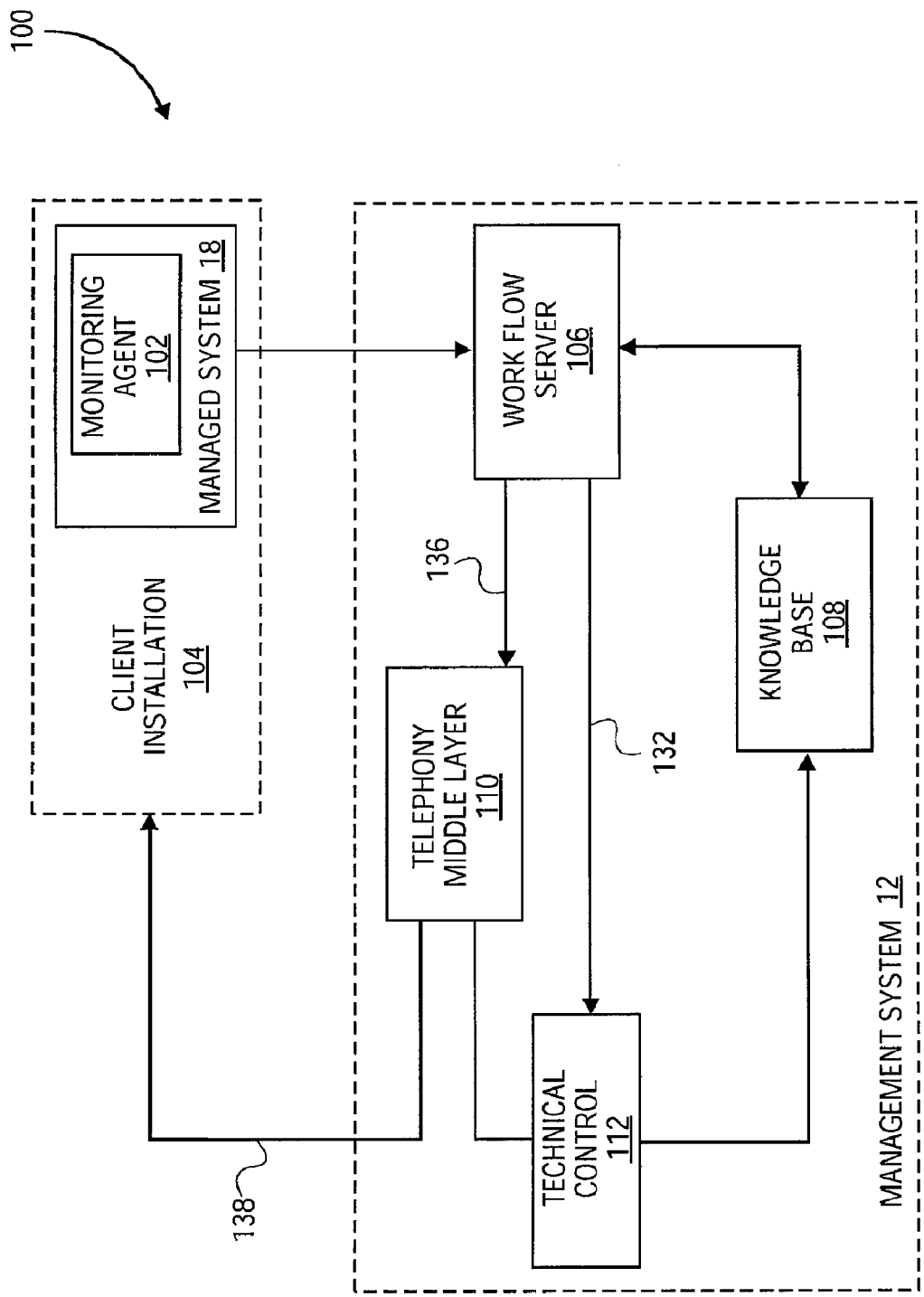
FIG. 5 is a schematic block diagram illustrating basic hardware components used in one embodiment of the invention.

Referring in particular to FIG. 5, reference numeral 100 generally indicates basic hardware components used in one embodiment of the invention. In one embodiment, the basic hardware components 100 form part of the system 10 (see FIG. 1) and, accordingly, like reference numerals have been used to indicate the same or similar features unless otherwise indicated.

The basic hardware components 100 include a monitoring application or monitoring agent 102 (see also FIG. 1) provided on the managed system 18 at a client or customer installation 104. In one embodiment, at the management system 12, a work flow server 106, a knowledge database 108, a telephony middle layer 110, and a technical console 112 are provided. The telephony middle layer 110 may form part of the support systems 24 of FIG. 2 and, in particular, part of the CTI 29. Likewise, the technical console 112 may also form part of the support systems 24. In one embodiment, the knowledge database 108 forms part of the data center 34 of the management platform 13 (see FIG. 2). In use, as described in more detail below, the monitoring agent 102 monitors events occurring on its associated managed system 18 and communicates these events to the management system 12 which, in an automated fashion and without human intervention, selectively initiates a voice call from the technical console 12 to the client installation 104 using the telephony middle layer 110.

Figure 6:
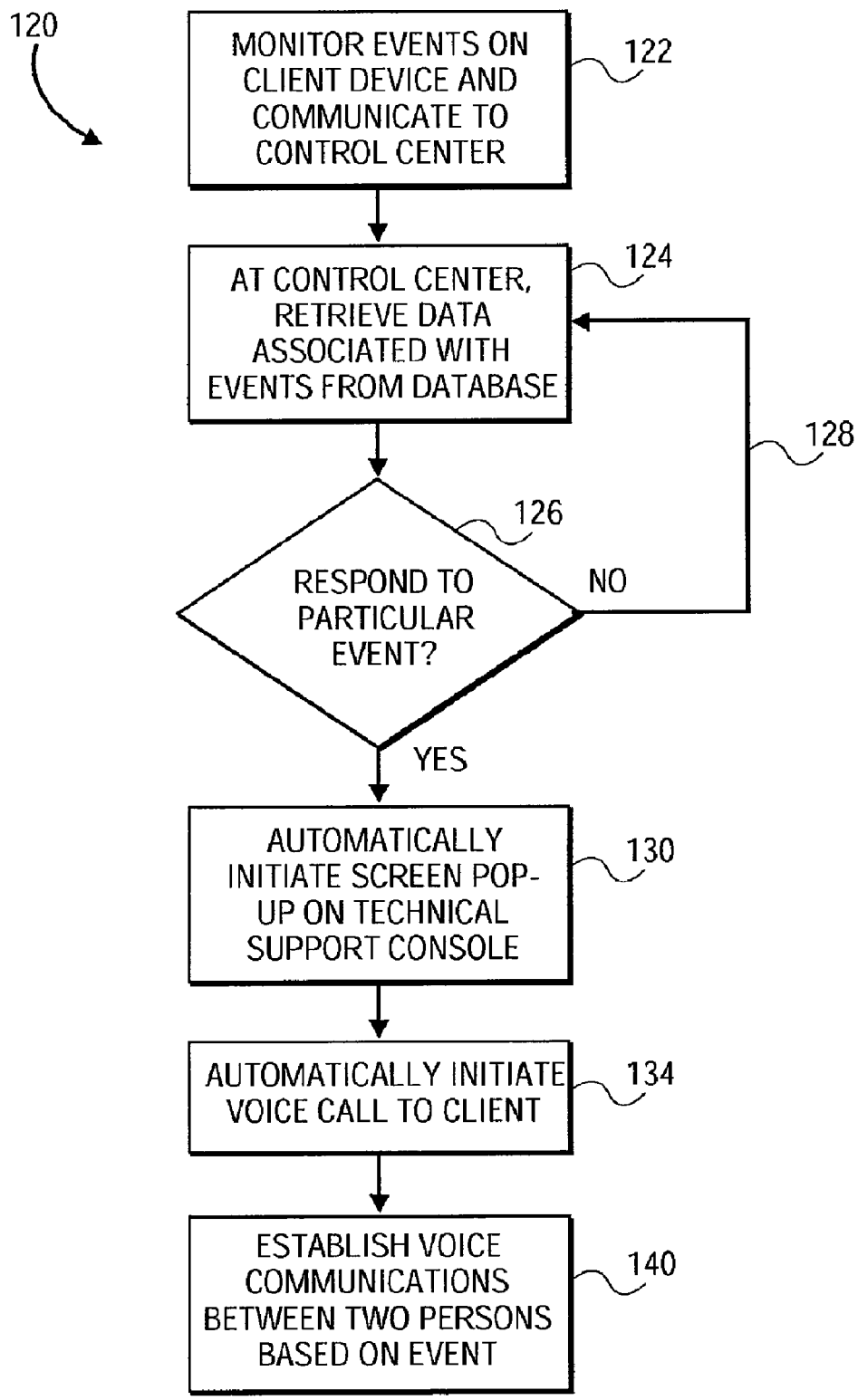
FIG. 6 is a schematic flow diagram illustrating a method, according to an exemplary embodiment of the invention, of initiating a verbal response to an occurrence of an event on a client device such as a managed computer.

Referring in particular to FIG. 6, reference numeral 120 generally indicates a method, in accordance with one embodiment of the invention, of responding to an event occurring on the managed systems 18. As shown at block 122, the monitoring agent 102 monitors events on a client device such as the managed system 18 and it communicates event data to the management system 12. In particular, the monitoring agent 102 hooks into an operating system of the managed system 18 and, when the operating system generates event codes, the monitoring agent 102 relays or communicates these event codes to the work flow server 106 of the management system 12. In certain embodiments, the operating system is a windows operating system such as Windows 98, Windows ME, Windows 2000, Windows XP, Windows NT, or any other operating system. The monitoring agent 102 may communicate event data in the form of codes generated by the particular operating system running on the managed system 18. For example, the event data may correspond to the operating system codes generated for errors such as high CPU usage, printer out of paper, printer problems, network connectivity problems, hardware device failure, or any other event which may occur at the managed system 18.

In certain embodiments, the error data is communicated to the control center 20 of the management system 12, e.g. to the work flow server 106 of the control center. The work flow server 106 as shown at block 124, retrieves data from the knowledge database 108 that is associated with the event occurring on the managed system 18. Thereafter, as shown at decision block 126, the method 120 decides whether or not to respond to the particular event and, if no response is required, the method 120 reverts to block 124 as shown by line 128. If, however, a response to the event is required, then the method 120 proceeds to block 130 in which it automatically initiates a screen pop-up on the technical console 112 (see line 132 in FIG. 5). In addition, as shown at block 134, the method 120 automatically initiates a voice call to the client installation 104 using the telephony middle layer 110 (see arrows 136 and 138 in FIG. 5). In one embodiment, the method 120 queues a response request at the technical console 112 so that when a technical support person becomes available to address the request, his or her telephone automatically rings and a voice connection is established by the telephony middle layer 110. Accordingly, voice communications are established between two persons in an automated fashion upon the occurrence of an event monitored electronically on the managed system 18 (see block 140 in FIG. 6).

As mentioned above, in order to assist the technical support person to address the event occurring on the managed system 18, the knowledge database 108 includes, in one embodiment, response data including comprehensive details on the managed system 18, predefined solutions to fault events occurring on the managed system 18, comprehensive hardware and software information (e.g. to prevent hardware and software conflicts), or the like. Thus, in an automated fashion, the technical console 112 establishes a voice communication with a person at the client installation 104 and also provides the technical support person with relevant response data about the managed system 18.

Figure 7:
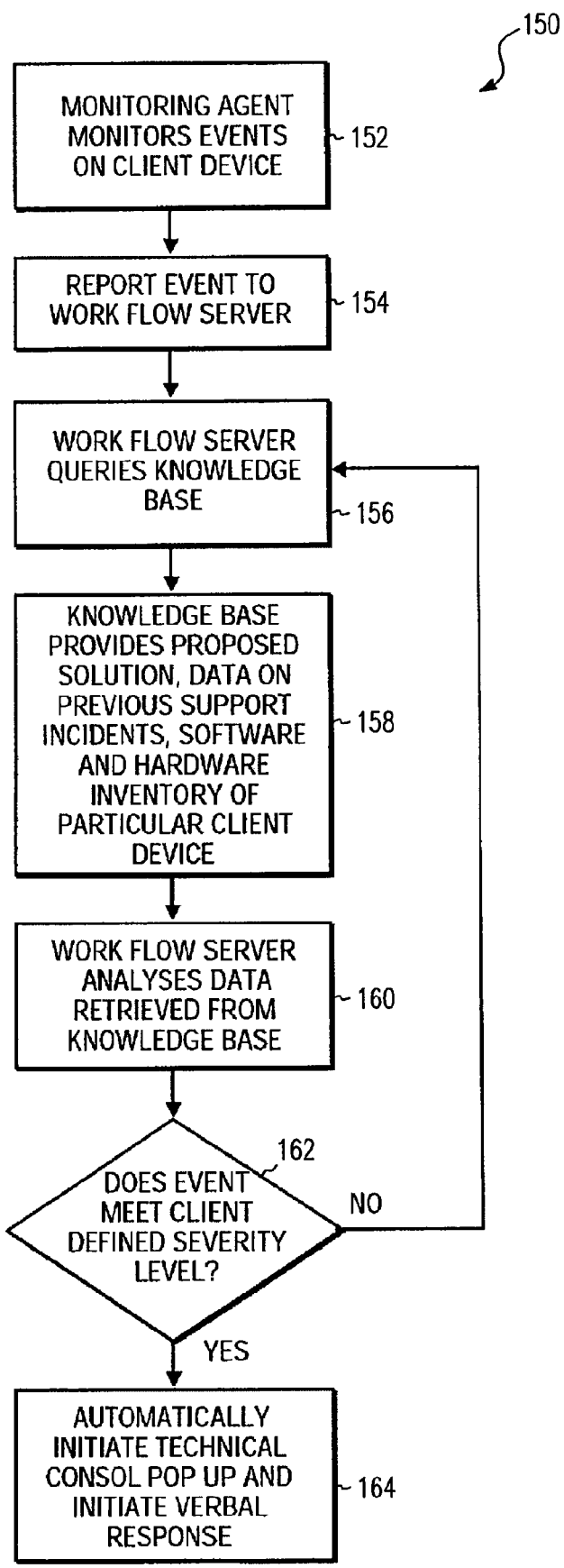
FIG. 7 is a schematic representation of a further flow diagram of the method of FIG. 6.

Referring to FIG. 7, reference numeral 150 generally indicates a more detailed breakdown of the method 120 of FIG. 6. Blocks 152 and 154 show further detail of the block 122 of FIG. 6. In particular, the monitoring agent 102 monitors for events on the managed system 18 or client device (see block 152) and then, as shown at block 154, reports the events as they occur to the work flow server 106. In certain embodiments, the monitoring agent 102 merely relays or communicates all events occurring on the managed system 18, and the management system 12 then decides whether or not a human voice response is required.

When the work flow server 106 receives each event from the monitoring agent 102, it queries the knowledge database 108 to retrieve comprehensive detail on the managed system 18, as well as comprehensive detail associated with the event, as described in more detail below. In one embodiment, the work flow server 106 receives all events from the managed system 18, logs all events as they occur to the knowledge database 106, as well as queries the knowledge database (see block 156) to obtain a client defined severity level and thereafter, if necessary, processes the event based on the severity level.

As shown at block 158, the knowledge database 108 includes response data, which provides a proposed solution to a fault event occurring on the managed system 18, provides data on previous support incidents, on software and hardware inventory of a particular customer device which the monitoring agent 102 is monitoring, as well as a client defined severity level associated with each event. Accordingly, power users that can generally resolve minor problems may have a much higher severity level requirement to initiate a voice communication by the technical console 112. It is to be appreciated that the knowledge database 108 may include further data which assists a technical support person to resolve an unfavorable event on the managed system 18.

In one embodiment, the work flow server 106 analyzes the data received from the knowledge database 108 and, based on the severity level, in an automated fashion and without human intervention initiates a telephone call to the client installation 104. As shown at decision block 162, if the event meets the client defined severity level then the work flow server 106 initiates a voice call to the client installation 104 and also generates a pop-up menu or user interface on the technical console 112 to which the technical support person must respond (see block 164). Returning to decision block 162, if the event does not meet the client or customer defined severity level, for example, the event is minor in nature such as a printer problem, which a person of reasonable skill at the client installation 104 may resolve, then the method 150 returns to block 156 as shown by line 166.

Exemplary screen pop-ups that are automatically generated at the technical console 112 are shown in FIGS. 8 and 9. In particular, FIG. 8 illustrates an assets details interface 170, according to an exemplary embodiment of the present invention, which may be generated by an assets application of the control center 20 when an event with the customer defined severity level occurs on the managed system 18. Specifically, the assets details interface 170 is shown to provide detailed information regarding the hardware and software assets of a managed system 18, and also regarding the services that are delivered to the specific managed system 18. The asset details interface 170 may be generated, for example, in an automated fashion when the voice communication to the client installation 104 is established.

FIG. 9 illustrates a service request interface 256, according to an exemplary embodiment of the present invention, which may be generated when an event with the customer defined severity level occurs on the managed system 18. The service request interface allows an IT administrator, for example, to view, edit, and create "trouble tickets" (or service requests) pertaining to a specific managed system 18 or group of managed systems 18. The exemplary service request interface 172 shown in FIG. 9 allows an IT administrator to retrieve service request information utilizing search criteria.

Figure 10:
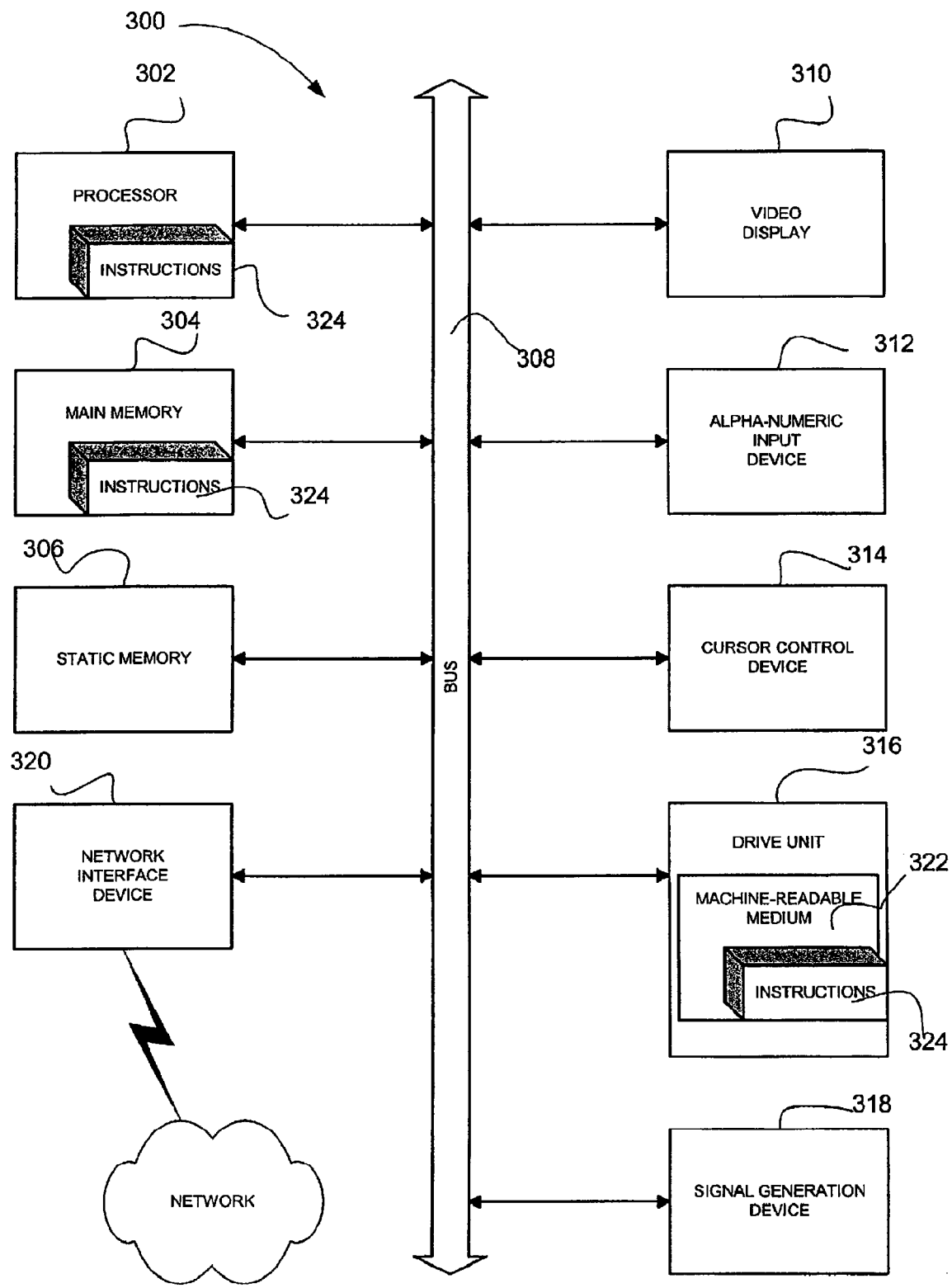
FIG. 10 illustrates a diagrammatic representation of machine in the exemplary form of a computer system within which a set of instructions, for causing the machine to perform any part of one or more of the methodologies discussed herein, may be executed.

FIG. 10 shows a diagrammatic representation of machine in the exemplary form of a computer system 300 within which a set of instructions, for causing the machine to perform any part of one or more of the methodologies discussed above, may be executed. In alternative embodiments, the machine may comprise a network router, a network switch, a network bridge, a set-top box (STB), Personal Digital Assistant (PDA), a cellular telephone, a web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a cursor control device 314 (e.g., a mouse), a disk drive unit 316, a signal generation device 318 (e.g., a speaker) and a network interface device 320.

The disk drive unit 316 includes a machine-readable medium 322 on which is stored a set of instructions (software) 324 embodying any one, or all or part, of the methodologies or functions described herein. The software 324 is also shown to reside, completely or at least partially, within the main memory 304 and/or within the processor 302. The software 324 may further be transmitted or received via the network interface device 320. For the purposes of this specification, the term "machine-readable medium" shall be taken to include any medium that is capable of storing, encoding or carrying a sequence of instructions for execution by the machine and that cause the machine to perform any one of the methodologies of the present invention. The term "machine-readable medium" shall accordingly be taken to include, but not be limited to, solid-state memories and optical and magnetic disks.

Thus, a method and system for managing services for a managed computer system have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of responding to an event occurring on at least one managed computer system, the method comprising:
   receiving event data from a monitoring agent on a managed computer system at a client installation, the event data being associated with the event;
   automatically processing the event data at a management system to determine that a verbal response is required;
   generating, at the management system, an asset report comprising at least an installed software list including a list of software installed on the managed computer system;
   based on the determination that a verbal response is required,
      automatically initiating a voice call between a support person and the client installation; and
      automatically generating a user interface on a technical support console to display the installed software list to the support person.

2. The method of claim 1, which includes retrieving associated response data in a reference database, the associated response data being associated with the event and the managed computer system.

3. The method of claim 1, which includes identifying if the event meets a customer defined severity level, and initiating the voice call when the event meets the customer defined severity level.

4. The method of claim 3, wherein each event has a plurality of customer defined severity levels, each severity level being associated with a specific customer.

5. The method of claim 2, which includes queuing the voice call at a technical support console until the technical support person is available to respond to the event, and providing the response data to the technical support person, using the user interface.

6. The method of claim 5, which includes initiating the voice call and the user interface in an automated fashion without human interaction in response to the event.

7. The method of claim 6, wherein the monitoring agent hooks into an operating system on the managed computer system to obtain the event data.

8. The method of claim 6, wherein the event data corresponds to events on a Windows™ operating system.

9. A system to facilitate provision of services to a managed computer system, the system comprising:
   a receiver to receive event data from a monitoring agent on the managed computer system at a client installation;
   a asset module to generate, at the management system, an asset report comprising at least an installed software list including a list of software installed on the managed computer system;
   a server to generate a user interface on a technical support console to display the installed software list to a technical support person; and
   a processor to process the event data at a management system to automatically determine that a verbal response is required and to automatically initiate a voice call to the client installation based on the determination that the verbal response is required.

10. The system of claim 9, wherein associated response data is retrieved from a reference database, the associated response data being associated with the event and the managed computer system.

11. The system of claim 10, wherein the processor identifies if the event meets a customer defined severity level, and initiates the voice call when the event meets the customer defined severity level.

12. The system of claim 11, wherein each event has a plurality of customer defined severity levels, each severity level being associated with a specific customer.

13. The system of claim 10, wherein the voice call is queued at a technical support console until a technical support person is available to respond to the event, and the user interface is used to provide the response data to the technical support person.

14. The system of claim 13, wherein the voice call and the user interface is initiated in an automated fashion without human interaction in response to the event.

15. The system of claim 14, wherein the monitoring agent hooks into an operating system on the managed computer system to obtain the event data.

16. The system of claim 14, wherein the event data corresponds to events on a Windows™ operating system.

17. A machine-readable medium storing a sequence of instructions that, when executed by a machine, cause the machine to execute a method of responding to an event occurring on at least one managed computer system, the method comprising:
   receiving event data from a monitoring agent on the managed computer system at a client installation, the event data being associated with the event;
   automatically processing the event data at a management system to determine that a verbal response is required;
   generating, at the management system, an asset report comprising at least an installed software list including a list of software installed on the managed computer system;
   based on the determination that a verbal response is required,
      automatically initiating a voice call between a support person and the client installation;
      automatically generating a user interface on a technical support console to display the installed software list to the support person.

18. The machine-readable medium of claim 17, wherein associated response data is retrieved from a reference database, the associated response data being associated with the event and the managed computer system.

19. The machine-readable medium of claim 17, wherein the voice call is initiated if the event meets a customer-defined severity level.

20. The machine-readable medium of claim 19, wherein each event has a plurality of customer defined severity levels, each severity level being associated with a specific customer.

21. The machine-readable medium of claim 18, wherein the voice call is queued at a technical support console until a technical support person is available to respond to the event, and the user interface is used to provide the response data to the technical support person.

22. The machine-readable medium of claim 21, wherein the voice call and the user interface are initiated in an automated fashion without human interaction in response to the event.

23. The machine-readable medium of claim 21, wherein the monitoring agent hooks into an operating system on the managed computer system to obtain the event data.

24. The machine-readable medium of claim 21, wherein the event data corresponds to events on a Windows™ operating system.

25. A system to facilitate provision of services to a managed computer system, the system comprising:
   means for receiving event data from a monitoring agent on the managed computer system at a client installation;
   means for generating, at the management system, an asset report comprising at least an installed software list including a list of software installed on the managed computer system;
   means for generating a user interface on a technical support console to display the installed software list to a technical support person; and
   processor means for automatically processing the event data at a management system to determine that a verbal response is required and automatically initiating a voice call to the client installation based on the determination that the verbal response is required.

* * * * *

UNITED STATES PATENT AND TRADEMARK OFFICE
CERTIFICATE OF CORRECTION

PATENT NO. : 7,627,667 B1  Page 1 of 1
APPLICATION NO. : 10/306049
DATED : December 1, 2009
INVENTOR(S) : Rive et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1765 days.

Signed and Sealed this

Second Day of November, 2010

David J. Kappos
*Director of the United States Patent and Trademark Office*